(12) United States Patent
Voigt

(10) Patent No.: US 12,553,106 B2
(45) Date of Patent: Feb. 17, 2026

(54) SULPHIDE OXIDATION IN LEACHING OF MINERALS

(71) Applicant: Glencore Technology Pty Limited, Brisbane (AU)

(72) Inventor: Paul Voigt, Brisbane (AU)

(73) Assignee: Glencore Technology Pty Limited, Brisbane (AU)

( * ) Notice: Subject to any disclaimer, the term of this patent is extended or adjusted under 35 U.S.C. 154(b) by 674 days.

(21) Appl. No.: 17/918,680

(22) PCT Filed: Apr. 15, 2021

(86) PCT No.: PCT/AU2021/050334
§ 371 (c)(1),
(2) Date: Oct. 13, 2022

(87) PCT Pub. No.: WO2021/207791
PCT Pub. Date: Oct. 21, 2021

(65) Prior Publication Data
US 2023/0147263 A1    May 11, 2023

(30) Foreign Application Priority Data
Apr. 17, 2020 (AU) ................... 2020901220

(51) Int. Cl.
*C22B 11/00* (2006.01)
*C22B 3/04* (2006.01)
*C22B 3/44* (2006.01)

(52) U.S. Cl.
CPC ............. *C22B 11/04* (2013.01); *C22B 3/04* (2013.01); *C22B 3/44* (2013.01)

(58) Field of Classification Search
CPC ...................................................... C22B 11/04
See application file for complete search history.

(56) References Cited

U.S. PATENT DOCUMENTS 5,650,057 A    7/1997    Jones
5,993,635 A    11/1999   Hourn et al.
6,660,059 B2   12/2003   Ji et al.
(Continued)

FOREIGN PATENT DOCUMENTS

EP    1101829 A1    5/2001
WO    WO-9629439 A1    9/1996
(Continued)

OTHER PUBLICATIONS

Mathe, Vijaya; International Search Report; PCT/AU2021/050334; Dated Jun. 21, 2021; 5 pages.
(Continued)

*Primary Examiner* — Jophy S. Koshy
*Assistant Examiner* — Joshua S Carpenter
(74) *Attorney, Agent, or Firm* — Bradley Arant Boult Cummings LLP

(57) ABSTRACT

A process for treating minerals containing metal sulphide and a precious metal, the process comprising fine grinding the minerals and subjecting the minerals to a first leaching step conducted under oxidising conditions at a pH of from 5 to 7, and subjecting a pulp or suspension or solid residue from the first leaching step to a second leaching step conducted under oxidising conditions at a pH of at least 9.0.

16 Claims, 1 Drawing Sheet

(56) References Cited

U.S. PATENT DOCUMENTS

| | | | |
|---|---|---|---|
| 6,833,021 B1 * | 12/2004 | Hourn | ..................... C22B 3/12 |
| | | | 423/28 |
| 10,190,193 B2 | 1/2019 | Hourn et al. | |
| 2016/0258038 A1 * | 9/2016 | Hourn | ................... C22B 34/22 |
| 2023/0193418 A1 | 6/2023 | Voigt | |

FOREIGN PATENT DOCUMENTS

| | | |
|---|---|---|
| WO | WO-9641029 A2 | 12/1996 |
| WO | WO-0017407 A1 | 3/2000 |
| WO | WO-20017407 A1 | 2/2001 |
| WO | WO-2001088212 A2 | 11/2001 |
| WO | WO-200404294 A1 | 1/2004 |

OTHER PUBLICATIONS

Bal, Heramb; International Search Report; PCT/AU2021/050335; Dated Jul. 1, 2021; 8 pages.

\* cited by examiner

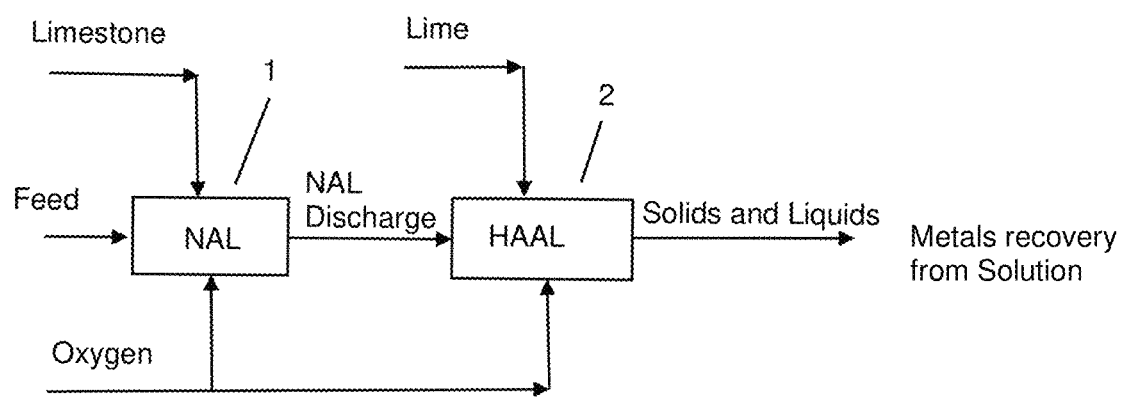

SULPHIDE OXIDATION IN LEACHING OF MINERALS

TECHNICAL FIELD

The present invention relates to a process for treating minerals.

BACKGROUND ART

The Albion Process™ is an atmospheric leaching process developed by Mount Isa Mines, now Glencore Technology, in 1994. The Albion Process™ can operate under three operating regimes, namely, acidic (around pH 1.0), neutral (around pH 5.0) and alkaline (around pH 9.0). Acid Albion Process™ Leaching (AAL) conditions are generally employed for the treatment of iron sulphide and base metal concentrates as described by W/O 96/29439. Neutral Albion Process™ Leaching (NAL) and Alkaline Albion Process™ (HAAL). Leaching is generally employed for the treatment of non-base metal concentrates such as iron sulphide and iron-arsenic sulphide concentrates. The objective of the Albion Process™ is oxidation of sulphides to allow liberation of metals for downstream recovery. The Albion Process™ comprises two fundamental steps. The first is mechanical liberation through the action of fine grinding, most suitably achieved in an IsaMill™ horizontal grinding plant. The second is oxidation of the finely ground feed at atmospheric pressure utilising supersonic oxygen injection and specially designed Oxidative Leach Reactors to maximise oxygen utilisation and process efficiency.

In the NAL system, concentrates may be fed that contain both base metals and precious metals. In the NAL system, the base metals are not solubilised and NAL conditions are more commonly used for oxidation of iron sulphides containing precious metals that are refractory to conventional processing flowsheets. In this case, sulphides are oxidised and the precious metals such as gold, silver, platinum, palladium and other known precious metals remain in the solid phase.

Following the NAL process, the now oxidised residue contains precious metals along with other components including gypsum, iron oxides (goethite), iron sulphate complexes such as jarosite, insoluble or unreacted gangue and any unreacted sulphides such as pyrite. Ordinarily, the slurry is directed to a process to recover the precious metals. The incumbent processes for the recovery of precious metals from a solid feed are typically the family of cyanidation processes commonly employed in the gold industry to recover gold from free milling ores. This process involves contacting the slurry with sodium cyanide at an elevated pH (above 10.0) in the presence of mild oxidative conditions to leach the gold and other precious metals into solution. The gold is recovered from solution by contacting the solution with an adsorbent such as activated carbon or ion exchange resin. In the case or carbon, the carbon can be in-situ in the cyanidation process (Carbon-In-Leach) or by contacting the gold bearing solution with carbon in a separate contacting tank (Carbon-In-Pulp).

The NAL system has a significant advantage over acid leaching systems because no elemental sulphur is formed as a reaction product, although downstream processing problems can arise.

In the NAL system, processing problems can arise when sending the leach residue directly to cyanidation. One problem is that unreacted sulphides present in the residue tend to act negatively on precious metals recovery and cause an elevation of cyanide consumption. Another problem is that precious metals can be locked in the reaction products or the minerals in which they are hosted which are not broken down in the NAL conditions. One example of this is gold hosted with tellurides.

Our earlier international patent application publication number WO 2004/042094 describes a process for reducing cyanide consumption in leaching precious metals by fine grinding the ore and subjecting the ground ore to a leaching step in the presence of an alkaline material and oxygen, adjusting the leaching step such that the amount of oxidation is between 9% to 20%, and subjecting the partially oxidized ore/concentrate to a cyanide extraction step. This process is operated at a pH of from 5 to 7.

It will be clearly understood that, if a prior art publication is referred to herein, this reference does not constitute an admission that the publication forms part of the common general knowledge in the art in Australia or in any other country.

SUMMARY OF INVENTION

The present invention is directed to a process for treating minerals, which may at least partially overcome at least one of the abovementioned disadvantages or provide the consumer with a useful or commercial choice.

With the foregoing in view, the present invention in one form, resides broadly in a process for treating minerals containing metal sulphide and a precious metal, the process comprising fine grinding the minerals and subjecting the minerals to the first leaching step conducted under oxidising conditions at a pH of from 5 to 7, and subjecting a pulp or suspension or solid residue from the first leaching step to a second leaching step conducted under oxidising conditions at a pH of at least 9.0.

In one embodiment, the process further comprises recovering precious metals from a solid residue or pulp or slurry from the second leaching step.

The first leaching step is conducted a pH of between 5 and 7, suitably at a pH of 5.5 to 6, or at a pH of about 5.5. Lime or limestone, or other alkaline materials, may be used to maintain the pH at these levels.

In some embodiments of the present invention, the minerals that are fed to the first leaching step are finally ground. In some embodiments, the minerals that are fed to the first leaching step are ground such that they have a $P_{80}$ of 25 µm or less, or 20 µm or less.

The first leaching step is suitably conducted under atmospheric conditions. The first leaching step may be conducted at a temperature up to the boiling point of the mixture in the first leaching step. The first leaching step may be conducted a temperature of from 50° C. up to the boiling point of the mixture in the first leaching step. The first leaching step may be conducted in open tanks.

In one embodiment, the minerals that are treated in the first leaching step are transferred to a second leaching reactor or a second leaching train and the second leaching step takes place in the second leaching reactor or in the second leaching train. In another embodiment, conditions in a leaching reactor or a leaching train in which the first leaching step is conducted are adjusted by increasing the pH to thereby conduct the second leaching step. In this embodiment, the second leaching step is conducted in the same leaching reactor or the same leaching train as the first leaching step.

Processing considerations indicate that it is likely that a preferred embodiment of the present invention will involve the second leaching step being conducted in a separate leaching reactor or a separate leaching train to the first leaching step. In this embodiment, a slurry from the first leaching step may flow directly to another leaching reactor or leaching train with no solid/liquid separation required. The pH of the slurry would be lifted from the nominal pH of about 5.5 in the first leaching step to at least 9.0, preferably at least 10.0, in the second leaching step by the addition of any known alkali. Re-grinding can be considered after the first leaching step.

In the second leaching step, oxygen is injected into the leach reactor and the leach reactor is held at a pH of at least 9.0 to further oxidise unreacted sulphides and to liberate any precious metals locked within any reaction products arising from the first leaching step.

The second leaching step may be conducted at atmospheric pressure. The second leaching step may be conducted at a temperature up to the boiling point of the slurry, such as from 50° C. up to the boiling point of the slurry. An oxygen containing gas may be injected in the second leaching step in order to provide oxidising conditions. The slurry may have a residence time of from 6 to 48 hours in the second leaching step.

Once the second leaching step has been completed, the slurry is then directed to any known process for the leaching of oxidised residue for the recovery of precious metals. For example, the residue may be leached with cyanide or with thiosulphate to leach the precious metals from the residue and the precious metals may then be recovered from the leach solution. Carbon in pulp or carbon in liquor processes may be used to recover the dissolved precious metals. Ion exchange resins may be used to recover the dissolved precious metals. These processes are known to person skilled in the art and need not be described further.

In some embodiments, the minerals that are treated by the present invention include sulphide minerals and/or sulphide concentrates that contain iron sulphides and precious metals.

Throughout this specification, the term "precious metal" includes gold and/or silver.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which:

FIG. 1 shows a flowsheet of a process in accordance with one embodiment of the present invention

DESCRIPTION OF EMBODIMENTS

It will be understood that the drawings have been provided for the purposes of illustrating preferred embodiments of the present invention. Therefore, the skilled person will appreciate that the present invention should not be considered to be limited solely to the features as shown in the drawings.

In the NAL system, sulphide material is fed to the Albion Process™ which is described in WO 00/17407 and illustrated in FIG. 1 (Step 1), albeit with the pH in the first leaching step (step 1) being at a pH of from 5 to 7, suitably about pH 5.5. After oxidation of sulphides at around pH 5.5 the slurry can flow directly to the HAAL circuit which comprises between one and six Oxidative Leach Reactors that are added onto the main NAL Albion Process™ leaching train (Step 2 in FIG. 1).

In the second leaching step (step 2) the pH is raised to at least pH 9.0 but more favourably pH 10.0 with any known alkali, with a calcium based alkali such as lime or limestone typically being the most economical.

Oxygen is injected to the base of the HAAL reactors, more favourably with the HyperSparge™ supersonic gas injector to maximise oxygen utilisation.

The oxygen injection and elevated pH serves a number of duties in the HAAL circuit, as follows:

The first is to oxidise any slow leaching sulphides hosting precious metals such as pyrite.

The second is for the breakdown of iron complexes formed as reaction products of the NAL Albion Process™ (step 1) which lock precious metals from leaching with thiosulphate or downstream cyanidation such as jarosites.

The third is for the breakdown of refractory compounds which lock precious metals from leaching with thiosulphate or downstream cyanidation such as tellurides.

The residence time in the process is typically 6 to 48 hours depending on the reaction kinetics specific to each system and the HAAL leaching train may comprise a single or several additional Oxidative Leach Reactors.

The process will operate autothermally with the heat of reactions driving the operating temperature. No external cooling or heating is required.

The resulting slurry is then directed to the downstream process for the recovery of precious metals from the residue with known methods to those skilled in the art. These processes may include a solid/liquid separation step to separate the solid residue from the liquor, followed by cyanidation treatment of the solid residue to recover precious metals therefrom.

Preferred embodiments of the process of the present invention can provide at least the following advantages:

The first advantage arises in that limestone can be used in the first leaching stage (NAL) where most of the oxidation is done. Limestone is cheaper than any other alkali source. The second advantage arises in that when limestone is used, the carbonate ions generated help to stabilize some $Fe^{3+}$ in solution and the action of the $Fe^{2+}/Fe^{3+}$ couple facilitate the transfer of electrons and hence oxidation making the oxidation process more effective In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A process for treating minerals containing metal sulphide and a precious metal, the process comprising:
   fine grinding the minerals such that they have a P80 of 25 µm or less and subjecting the minerals to a first leaching step conducted under oxidising conditions at a pH of from 5 to 7;
   subjecting a pulp or suspension or solid residue from the first leaching step to a second leaching step conducted under oxidising conditions at a pH of at least 9.0 to provide an oxidised residue; and
   leaching the oxidised residue with cyanide or thiosulphate to recover the precious metal.

2. The process as claimed in claim 1, wherein limestone is used to maintain pH at 5 to 7 in the first leaching step.

3. The process as claimed in claim 1, wherein the first leaching step is conducted at a pH of between 5.5 to 6.

4. The process as claimed in claim 1, wherein the minerals have a $P_{80}$ of 20 µm or less.

5. The process as claimed in claim 1, wherein the first leaching step is conducted under atmospheric conditions.

6. The process as claimed in claim 1, wherein the first leaching step is conducted at a temperature up to the boiling point of a slurry formed in the first leaching step.

7. The process as claimed in claim 1, wherein the minerals that are treated in the first leaching step are transferred to a second leaching reactor and the second leaching step takes place in the second leaching reactor.

8. The process as claimed in claim 1, wherein conditions in a leaching reactor or a leaching train in which the first leaching step is conducted are adjusted by increasing the pH to thereby conduct the second leaching step.

9. The process as claimed in claim 1, wherein the pH of a slurry formed in the second leaching step is raised from a nominal pH of 5.5 in the first leaching step to at least 9.0 by the addition of an alkali.

10. The process as claimed in claim 1, wherein the second leaching step is conducted at atmospheric pressure.

11. The process as claimed in claim 1, wherein the second leaching step is conducted at a temperature up to the boiling point of a slurry formed in the second leaching step.

12. The process as claimed in claim 1, wherein an oxygen containing gas is injected in the second leaching step in order to provide oxidising conditions.

13. The process as claimed in claim 1, wherein a residence time of the second leaching step is from 6 to 48 hours.

14. The process as claimed in claim 1, wherein:
   in the first leaching step limestone is used to maintain the pH; and
   in the second leaching step lime is used to maintain the pH.

15. The process as claimed in claim 7, wherein a slurry from the first leaching step flows directly to the second leaching reactor.

16. The process as claimed in claim 7, wherein in the second leaching step, oxygen is injected into the second leaching reactor and the second leaching reactor is held at a pH of at least 9.0 to further oxidise unreacted sulphides and to liberate any precious metals locked within any reaction products arising from the first leaching step.

* * * * *